US011016178B2

(12) United States Patent
Donovan

(10) Patent No.: US 11,016,178 B2
(45) Date of Patent: May 25, 2021

(54) EYE-SAFE SCANNING LIDAR SYSTEM

(71) Applicant: Opsys Tech Ltd., Holon (IL)

(72) Inventor: Mark J. Donovan, Mountain View, CA (US)

(73) Assignee: Opsys Tech Ltd., Holon (IL)

( * ) Notice: Subject to any disclaimer, the term of this patent is extended or adjusted under 35 U.S.C. 154(b) by 311 days.

(21) Appl. No.: 15/915,840

(22) Filed: Mar. 8, 2018

(65) Prior Publication Data

US 2018/0259623 A1 Sep. 13, 2018

Related U.S. Application Data

(60) Provisional application No. 62/470,827, filed on Mar. 13, 2017.

(51) Int. Cl.
*G01S 7/48* (2006.01)
*G01S 7/481* (2006.01)
(Continued)

(52) U.S. Cl.
CPC ............ *G01S 7/4815* (2013.01); *G01S 7/484* (2013.01); *G01S 17/931* (2020.01)

(58) Field of Classification Search
CPC ...... G01S 7/4818; G01S 17/42; G01S 17/931; G01S 7/4811; G01S 7/4804; G01S 17/06;
(Continued)

(56) References Cited

U.S. PATENT DOCUMENTS

| | | | |
|---|---|---|---|
| 5,552,893 | A | 9/1996 | Akasu |
| 5,909,296 | A | 6/1999 | Tsacoyeanes |

(Continued)

FOREIGN PATENT DOCUMENTS

| | | | |
|---|---|---|---|
| DE | 197 17 399 | A1 | 6/1999 |
| EP | 1569007 | A2 | 8/2005 |

(Continued)

OTHER PUBLICATIONS

"Notification Concerning Transmittal of International Preliminary Report on Patentability (Chapter I of the Patent Cooperation Treaty)" for International Patent Application No. PCT/US2018/021553, dated Sep. 26, 2019, 9 pages, the International Bureau of WIPO, Geneva, Switzerland.

(Continued)

*Primary Examiner* — Luke D Ratcliffe
(74) *Attorney, Agent, or Firm* — Rauschenbach Patent Law Group, LLC; Kurt Rauschenbach

(57) ABSTRACT

A LIDAR illuminator includes a plurality of laser sources, each comprising an electrical input that receives a modulation drive signal that causes each of the plurality of laser sources to generate an optical beam. A controller having a plurality of electrical outputs, where a respective one of the plurality of electrical outputs is connected to an electrical input of a respective one of the plurality of laser sources, generates a plurality of modulation drive signals that cause the plurality of laser sources to generate a plurality of optical beams that form a combined optical beam. A peak optical energy of the combined optical beam in a measurement aperture at a measurement distance is less than a desired value.

20 Claims, 8 Drawing Sheets

(51) Int. Cl.
*G01S 7/484* (2006.01)
*G01S 17/931* (2020.01)

(58) Field of Classification Search
CPC ...... G01S 7/4863; G01S 17/88; G01S 7/4815; G01S 7/4816; G01S 7/484; G01S 17/26; G01S 7/4817; G01S 7/4873; G01S 7/4876; G01S 17/89; G01S 17/02; H01S 3/0078; H01S 3/06733; H01S 3/0007; H01S 5/4012; H01S 3/06754; H01S 3/1106; H01S 3/094042; H01S 3/06758; H01S 3/10023; H01S 5/4087; H01S 3/0675; H01S 3/084076; H01S 3/08086
See application file for complete search history.

(56) References Cited

U.S. PATENT DOCUMENTS

| | | | |
|---|---|---|---|
| 6,061,001 | A | 5/2000 | Sugimoto |
| 6,353,502 | B1 | 3/2002 | Marchant et al. |
| 6,680,788 | B1 | 1/2004 | Roberson et al. |
| 6,775,480 | B1 | 8/2004 | Goodwill |
| 6,788,715 | B1 | 9/2004 | Leeuwen et al. |
| 6,829,439 | B1 | 12/2004 | Sidorovich et al. |
| 6,860,350 | B2 | 3/2005 | Beuhler et al. |
| 6,888,871 | B1 | 5/2005 | Zhang et al. |
| 7,065,112 | B2 | 6/2006 | Ghosh et al. |
| 7,110,183 | B2 | 9/2006 | Von Freyhold et al. |
| 7,544,945 | B2 | 6/2009 | Tan et al. |
| 7,652,752 | B2 | 1/2010 | Fetzer et al. |
| 7,746,450 | B2 | 6/2010 | Willner et al. |
| 7,969,558 | B2 | 6/2011 | Hall |
| 8,072,581 | B1 | 12/2011 | Breiholz |
| 8,115,909 | B2 | 2/2012 | Behringer et al. |
| 8,247,252 | B2 | 8/2012 | Gauggel et al. |
| 8,301,027 | B2 | 10/2012 | Shaw et al. |
| 8,576,885 | B2 | 11/2013 | Van Leeuwen et al. |
| 8,675,181 | B2 | 3/2014 | Hall |
| 8,675,706 | B2 | 3/2014 | Seurin et al. |
| 8,783,893 | B1 | 7/2014 | Seurin et al. |
| 8,824,519 | B1 | 9/2014 | Seurin et al. |
| 9,038,883 | B2 | 5/2015 | Wang et al. |
| 9,048,633 | B2 | 6/2015 | Gronenbom et al. |
| 9,268,012 | B2 | 2/2016 | Ghosh et al. |
| 9,285,477 | B1 | 3/2016 | Smith et al. |
| 9,348,018 | B2 | 5/2016 | Eisele et al. |
| 9,360,554 | B2 | 6/2016 | Retterath et al. |
| 9,378,640 | B2 | 6/2016 | Mimeault et al. |
| 9,392,259 | B2 | 7/2016 | Borowski |
| 9,516,244 | B2 | 12/2016 | Borowski |
| 9,520,696 | B2 | 12/2016 | Wang et al. |
| 9,553,423 | B2 | 1/2017 | Chen et al. |
| 9,560,339 | B2 | 1/2017 | Borowski |
| 9,574,541 | B2 | 2/2017 | Ghosh et al. |
| 9,658,322 | B2 | 5/2017 | Lewis |
| 9,674,415 | B2 | 6/2017 | Wan et al. |
| 9,791,557 | B1 * | 10/2017 | Wyrwas ................ G01S 7/4815 |
| 9,841,495 | B2 | 12/2017 | Campbell et al. |
| 9,857,468 | B1 * | 1/2018 | Eichenholz ........... G01S 7/4818 |
| 9,933,513 | B2 | 4/2018 | Dussan et al. |
| 9,946,089 | B2 | 4/2018 | Chen et al. |
| 9,989,406 | B2 | 6/2018 | Pacala et al. |
| 9,989,629 | B1 | 6/2018 | LaChapelle |
| 9,992,477 | B2 | 6/2018 | Pacala et al. |
| 10,063,849 | B2 | 8/2018 | Pacala et al. |
| 10,488,492 | B2 | 11/2019 | Hamel et al. |
| 10,761,195 | B2 | 9/2020 | Donovan |
| 2002/0117340 | A1 | 8/2002 | Stettner |
| 2003/0043363 | A1 | 3/2003 | Jamieson et al. |
| 2003/0147652 | A1 | 8/2003 | Green et al. |
| 2004/0120717 | A1 | 6/2004 | Clark et al. |
| 2004/0228375 | A1 | 11/2004 | Ghosh et al. |
| 2005/0025211 | A1 | 2/2005 | Zhang et al. |
| 2005/0232628 | A1 | 10/2005 | von Freyhold et al. |
| 2006/0231771 | A1 | 10/2006 | Lee et al. |
| 2007/0071056 | A1 | 3/2007 | Chen |
| 2007/0177841 | A1 | 8/2007 | Dazinger |
| 2007/0181810 | A1 | 8/2007 | Tan et al. |
| 2008/0074640 | A1 | 3/2008 | Walsh et al. |
| 2010/0215066 | A1 | 8/2010 | Mordaunt et al. |
| 2010/0271614 | A1 | 10/2010 | Albuquerque et al. |
| 2010/0302528 | A1 | 12/2010 | Hall |
| 2011/0176567 | A1 | 7/2011 | Joseph |
| 2013/0163626 | A1 | 6/2013 | Seurin et al. |
| 2013/0163627 | A1 | 6/2013 | Seurin et al. |
| 2013/0208256 | A1 | 8/2013 | Mamidipudi et al. |
| 2013/0208753 | A1 | 8/2013 | Van Leeuwen et al. |
| 2014/0043309 | A1 | 2/2014 | Go et al. |
| 2014/0071427 | A1 | 3/2014 | Last |
| 2014/0139467 | A1 | 5/2014 | Ghosh et al. |
| 2014/0218898 | A1 | 8/2014 | Seurin et al. |
| 2014/0247841 | A1 | 9/2014 | Seurin et al. |
| 2014/0333995 | A1 | 11/2014 | Seurin et al. |
| 2015/0055117 | A1 | 2/2015 | Pennecot et al. |
| 2015/0069113 | A1 | 3/2015 | Wang et al. |
| 2015/0131080 | A1 | 5/2015 | Retterath et al. |
| 2015/0160341 | A1 | 6/2015 | Akatsu et al. |
| 2015/0219764 | A1 | 8/2015 | Lipson |
| 2015/0255955 | A1 | 9/2015 | Wang et al. |
| 2015/0260830 | A1 | 9/2015 | Ghosh et al. |
| 2015/0311673 | A1 | 10/2015 | Wang et al. |
| 2015/0340841 | A1 | 11/2015 | Joseph |
| 2015/0362585 | A1 | 12/2015 | Ghosh et al. |
| 2015/0377696 | A1 | 12/2015 | Shpunt et al. |
| 2015/0378023 | A1 | 12/2015 | Royo Royo et al. |
| 2016/0072258 | A1 | 3/2016 | Seurin et al. |
| 2016/0080077 | A1 | 3/2016 | Joseph et al. |
| 2016/0161600 | A1 | 6/2016 | Eldada et al. |
| 2016/0254638 | A1 | 9/2016 | Chen et al. |
| 2016/0266242 | A1 | 9/2016 | Gilliland et al. |
| 2016/0291156 | A1 * | 10/2016 | Hjelmstad ............. G01S 7/4911 |
| 2016/0306358 | A1 | 10/2016 | Kang et al. |
| 2016/0348636 | A1 | 12/2016 | Ghosh et al. |
| 2017/0003392 | A1 | 1/2017 | Bartlett et al. |
| 2017/0059838 | A1 | 3/2017 | Tilleman |
| 2017/0115497 | A1 | 4/2017 | Chen et al. |
| 2017/0153319 | A1 | 6/2017 | Villeneuve et al. |
| 2017/0168162 | A1 | 6/2017 | Jungwirth |
| 2017/0181810 | A1 | 6/2017 | Tennican |
| 2017/0219426 | A1 | 8/2017 | Pacala et al. |
| 2017/0256915 | A1 | 9/2017 | Ghosh et al. |
| 2017/0285169 | A1 | 10/2017 | Holz |
| 2017/0289524 | A1 | 10/2017 | Pacala et al. |
| 2017/0307736 | A1 | 10/2017 | Donovan |
| 2017/0307758 | A1 | 10/2017 | Pei et al. |
| 2017/0353004 | A1 | 12/2017 | Chen et al. |
| 2018/0059222 | A1 | 3/2018 | Pacala et al. |
| 2018/0074198 | A1 | 3/2018 | Von Novak et al. |
| 2018/0152691 | A1 | 5/2018 | Pacala et al. |
| 2018/0167602 | A1 | 6/2018 | Pacala et al. |
| 2018/0180720 | A1 | 6/2018 | Pei et al. |
| 2018/0180722 | A1 | 6/2018 | Pei et al. |
| 2018/0203247 | A1 | 7/2018 | Chen et al. |
| 2018/0209841 | A1 | 7/2018 | Pacala et al. |
| 2018/0217236 | A1 | 8/2018 | Pacala et al. |
| 2018/0259624 | A1 | 9/2018 | Kiehn et al. |
| 2018/0259645 | A1 | 9/2018 | Shue et al. |
| 2018/0299552 | A1 | 10/2018 | Shue et al. |
| 2019/0170855 | A1 | 6/2019 | Keller et al. |

FOREIGN PATENT DOCUMENTS

| | | | |
|---|---|---|---|
| EP | 2656099 | A1 | 12/2011 |
| EP | 2656106 | A1 | 12/2011 |
| EP | 3168641 | B1 | 4/2016 |
| EP | 3497477 | A1 | 8/2016 |
| EP | 2656100 | A1 | 10/2016 |
| EP | 3526625 | A1 | 11/2016 |
| EP | 3 159 711 | A1 | 4/2017 |
| JP | 2003258359 | A | 9/2003 |
| JP | 4108478 | B2 | 6/2008 |
| JP | 2016-146417 | | 8/2016 |
| WO | 99-42856 | A1 | 8/1999 |
| WO | 2013107709 | A1 | 7/2013 |

(56) References Cited

FOREIGN PATENT DOCUMENTS

| | | | |
|---|---|---|---|
| WO | 2014/014838 | A1 | 1/2014 |
| WO | 2018028795 | A1 | 2/2018 |
| WO | 2018082762 | A1 | 5/2018 |
| WO | 2018166609 | A1 | 9/2018 |
| WO | 2018166610 | A1 | 9/2018 |
| WO | 2018166611 | A1 | 9/2018 |
| WO | 2019115148 | A1 | 6/2019 |

OTHER PUBLICATIONS

"European Search Report" for European Patent Application No. 17786325.5, dated Nov. 9, 2019, 18 pages, European Patent Office, Munich, Germany.
"Notification of Transmittal of the International Search Report and The Written Opinion of the International Searching Authority, or the Declaration" for International Patent Application No. PCT/US2018/041021, dated Nov. 5, 2018, 15 Pages, Korean Intellectual Property Office, Daejeon, Republic of Korea.
"Supplementary European Search Report" for European Patent Application No. EP17786325, dated Mar. 11, 2020, 22 pages, European Patent Office, Munich, Germany.
Notification Concerning Transmittal of International Preliminary Report on Patentability (Chapter I of the Patent Cooperation Treaty) for International Application No. PCT/US18/041021, dated Feb. 6, 2020, 10 pages, The International Bureau of WIPO, Geneva, Switzerland.
"Notification of Transmittal of the International Search Report and The Written Opinion of the International Searching Authority, or the Declaration" for International Patent Application No. PCT/US2018/021553, dated Jun. 20, 2018, 13 pages, International Searching Authority, Korean Intellectual Property Office, Daejeon, Republic of Korea.
"Notification of Transmittal of the International Search Report and the Written Opinion of the International Searching Authority, or the Declaration" for International Patent Application No. PCT/US2019/043674, dated Nov. 15, 2019, 16 pages, International Searching Authority/KR, Daejeon, Republic of Korea.
Notification of Transmittal of the International Search Report and the Written Opinion of the International Searching Authority, or the Declaration for International Patent Application No. PCT/US2019/024343, dated Jul. 12, 2019, 17 pages, ISA/KR, Korean Intellectual Property Office, Daejeon, Republic of Korea.
"Notification of Transmittal of the International Search Report and the Written Opinion of The International Searching Authority, or the Declaration" for International Patent Application No. PCT/US2018/057026, dated Dec. 16, 2019, 11 pages, International Searching Authority, Korean Intellectual Property Office, Daejeon, Republic of Korea.
Notification of Transmittal of the International Search Report and the Written Opinion of the International Searching Authority, or the Declaration, for International Application No. PCT/US2017/026109, dated Jun. 19, 2017, 17 pages, International Search Authority/Korean Intellectual Property Office, Daejeon, Republic of Korea.
U.S. Appl. No. 15/456,789, filed Mar. 13, 2017 in the USPTO.
U.S. Appl. No. 16/028,774, filed Jul. 6, 2018 in the USPTO.
"Written Opinion of the International Searching Authority" for International Patent Application No. PCT/EP2016/077499, dated Feb. 14, 2017, 7 pages, The International Searching Authority.
"Search Report" for International Patent Application No. PCT/EP2016/077499, 2 pages, International Searching Authority/ EPO, Rijswijk, the Netherlands.
"Extended Search Report" for European Patent Application No. 18767885.9, dated Nov. 18, 2020, 10 pages, European Patent Office, Munich, Germany.
"Japanese Office Action" for Japanese Patent Application No. 2019-549550, dated Mar. 22, 2021, 2 pages, Japanese Patent Office, Japan.

* cited by examiner

EYE-SAFE SCANNING LIDAR SYSTEM

CROSS REFERENCE TO RELATED APPLICATIONS

The present application is a non-provisional application of U.S. Provisional Patent Application No. 62/470,827, entitled "Eye-Safe Scanning LIDAR System" filed on Mar. 13, 2017. The entire contents of U.S. Provisional Patent Application No. 62/470,827 are herein incorporated by reference.

The section headings used herein are for organizational purposes only and should not to be construed as limiting the subject matter described in the present application in any way.

INTRODUCTION

Light detection and ranging (LIDAR) systems are one of the most critical sensors enabling real-time measurements of object distances. LIDAR systems measure distances to objects by illuminating those objects with a laser light. In some cases, LIDAR systems are used to sense the surroundings on vehicles. In these and other applications, the illuminated objects may be people. As such, there is a chance that the laser light from the LIDAR system will illuminate a person's eye.

Laser light can be very dangerous to a person's eye. The coherence and small beam divergence angle of laser light, combined with the lens of the eye, results in the laser light being focused to an extremely small spot size on the retina. This small spot size, with high enough laser optical power, can result in burning of the retina, and permanent damage to the eye. As such, LIDAR systems that can operate with eye-safe levels of laser light energy are needed.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
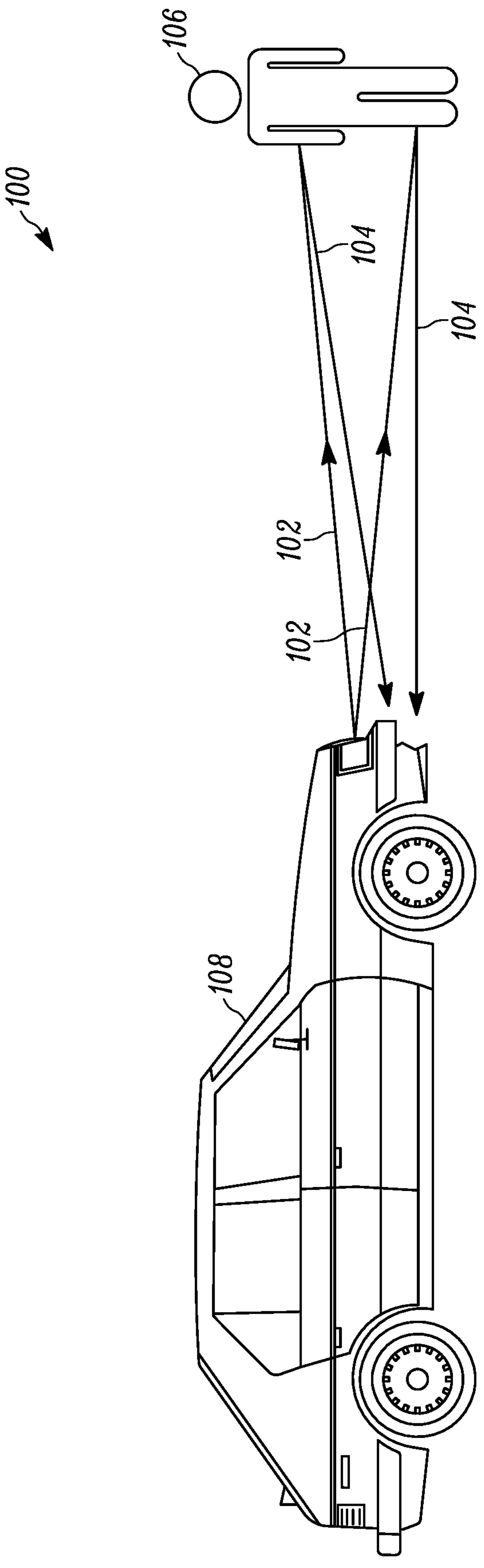
FIG. 1 illustrates a LIDAR system of the present teaching implemented on a vehicle.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The present teaching relates to Light Detection and Ranging Systems (LIDAR) that measure distances to various objects or targets that reflect and/or scatter light. In particular, the present teaching relates to LIDAR systems that are able to provide LIDAR measurements with a high refresh rate, up to 1 KHz, over a long range, in excess of 70 m, and ensuring system operation consistent with a Class 1 eye-safety standard.

Systems of the present teaching may use laser light sources that include single emitters and/or multiple emitters. For example, light sources that use a single element VCSEL or a single edge-emitting laser device would be considered single emitters. Light sources that use multiple VCSEL elements or multiple edge-emitting laser sources arranged on one or more substrates are considered multiple emitter sources. The multi-element emitters may be configured in various array configurations, including one-dimensional and two-dimensional arrays. One skilled in the art will appreciate that the below description of the present teaching refers to various embodiments of eye-safe scanning LIDAR systems with single-emitter sources and/or multi-emitter laser sources. It will be apparent to those familiar with the art that the features of particular embodiments of LIDAR systems of the present teaching should not be considered limited to either single-emitter and/or multi-emitter laser sources, but rather should be more broadly construed to apply to both single-emitter and/or multi-emitter laser sources.

FIG. 1 illustrates the operation of a LIDAR system 100 of the present teaching implemented in a vehicle. The LIDAR system 100 includes a laser projector, which is sometimes referred to as an illuminator, that projects light beams 102 generated by a light source toward a target scene. The LIDAR system 100 also includes a receiver that receives the light 104 that reflects off an object, shown as a person 106, in that target scene. The LIDAR system 100 can also include a controller that computes the distance to the object 106 from the reflected light. In various embodiments, the controller can be a simple electrical circuit or a more complicated processor, depending on the particular LIDAR requirements. In addition, the LIDAR system 100 also include an element that can scan or provide a particular pattern of the light, which may be a static pattern, across a desired range and field-of-view (FOV). The receiver and controller are used to convert the received signal light into measurements that represent a pointwise three-dimensional (3D) map of the surrounding environment that falls within the LIDAR system range and FOV.

The illuminator that includes the laser source and optical beam projector, as well as the receiver, is sometimes located on the front side of a vehicle 108. A person 106, and/or another object, such as a car or light pole, will provide light reflected from the source back to the receiver. A range or distance to that object is determined by the LIDAR receiver from the reflected light. The LIDAR receiver calculates range information based on time-of-flight measurements of light pulses emitted from the light source.

In addition, information about the optical beam profile that illuminates the scene in a target plane associated with a particular range that is known from, for example, the particular design of the source and projector system, is used to determine location information about the reflecting surface in order to generate a complete x,y,z, or three-dimensional picture of the scene. In other words, the pointwise three-dimensional map of the surrounding environment represents a collection of measurement data that indicates position information from all the surfaces that reflect the illumination from the source to the receiver within the field-of-view of the LIDAR system. In this way, a three-dimensional representation of objects in the field-of-view of the LIDAR system is obtained. The pointwise three-dimensional data map may also be referred to as a measurement point cloud.

Various embodiments of LIDAR systems of the present teaching operate with various laser pulse durations and laser pulse repetition rates, depending on the desired performance. One example is the sampling rate required for one embodiment of an automotive LIDAR system. A car moving at 100 kilometers per hour (kph) is traveling at roughly 28 millimeters per millisecond (mm/msec). If two cars are approaching each other, then the relative distance will decrease at twice that rate, or 56 mm/msec. For a system that is accurate across the full field-of-view, with a distance accuracy of 50 mm (~2 inches) for each measurement point, we need to be able to scan the complete FOV during that time. The eye-safe LIDAR systems of the present teaching may be applied to other types of LIDAR sensing applications, and are not restricted to sensing for a vehicle or automobile.

Multi-source and multi-wavelength LIDAR system have been proposed by the assignee of the present application. See, U.S. patent application Ser. No. 15/456,789, filed on Mar. 13, 2017 and entitled Multi-Wavelength LIDAR System. The entire contents of U.S. patent application Ser. No. 15/456,789 are incorporated herein by reference. For purposes of illustration, assume a multi-source LIDAR system using 1,000 laser clusters corresponding to particular desired three-dimensional pointwise measurement locations. In order to achieve positional accuracy across the full FOV, as described above, one would need to scan through all 1,000 lasers every millisecond. For a single-wavelength system, where we can only operate and detect one laser at a time, this means we have only one microsecond per laser to acquire the position information for that measurement point.

One feature of the multi-wavelength LIDAR system of the present teaching is that it provides a relatively high refresh rate. Refresh rate is sometimes referred to as frame rate. The refresh rate relates directly to how frequently the distance measurements of a three-dimensional or two-dimensional scene being sensed by the LIDAR are updated. Some embodiments of the present teaching provide a system refresh rate that is at least the same as current low-cost CMOS camera systems that typically have a refresh rate of 30 Hz. However, the refresh rate can be 1 kHz or higher. To understand why a high refresh rate is important, consider an automobile traveling at 100 km/hour. Under these conditions, the automobile will move about 3 meters in 0.1 seconds. So, if the refresh rate is only 10 Hz, objects in front of the car will move significantly in that time causing a significant loss of resolution.

For example, a LIDAR system of the present teaching that uses four wavelengths with 4,096 lasers that are being measured in one frame, and a pulse duration of one microsecond, the refresh rate would be 1 kHz for a single system. If multiple systems are used to cover the complete 360-degree field-of-view, then the refresh rate would still need to be 1 kHz. This assumes a single pulse per measurement. However, if multiple pulses per measurement are used, the refresh rate will be lower.

Laser eye-safety regulations have been established to set standards for the allowable amount of laser radiation that enters the eye without causing eye damage. The standards ensure that products emitting laser light are labeled in such a fashion that consumers understand the safety risks associated with a particular product. The most commonly referenced standard worldwide is IEC 60825-1, published by the International Electrotechnical Commission (IEC), which has been adopted in Europe as EN 60825-1. In the US, laser products are covered by CDRH 21 CFR 1040.10. Compliance with EN 60825-1 has been established as acceptable to meet the U.S. federal standard.

Laser eye-safety standards have different safety categories that are classified by wavelength and maximum output power. The standards define the maximum permissible exposure (MPE), which is specified as the optical power or energy that can pass through a fully open pupil, without causing any damage. The MPE is a function of energy so it is related to the laser pulse duration and repetition rate in a system where the laser pulsed (i.e. not operated continuously).

A Class 1 laser is safe under all conditions of normal use. The maximum permissible exposure (MPE) cannot be exceeded in a Class 1 product. It is highly desired for an automotive LIDAR system to be Class 1 eye safe. In a Class 1 rated LIDAR system, the laser light produced by the LIDAR system will not exceed the MPE in all cases where exposure to a human eye is possible.

Care must be taken in LIDAR systems to ensure Class 1 eye safety while also providing the highest system performance. System performance may include parameters such as angular resolution, refresh rate, field-of-view and range.

Many of these performance parameters are linked directly to the laser power and/or the intensity of an optical beam produced at a target plane of the LIDAR system. For example, in order to have the best possible signal-to-noise ratio in the receiver, and also to provide a long maximum distance range, it is desired to have the highest peak optical power for the transmitted laser pulses. However, Class 1 eye safety restricts the maximum peak optical power of each pulse.

For example, calculating from the International Electrotechnical Commission (IEC) standard IEC 60825-1 that for an exposure duration between 10 psec and 5 μsec, the allowable exposure energy for a 903-nm laser will be 0.392 μJoules. For a single laser pulse of duration of 5 nsec, transmitted every 5 μsec, assuming a square pulse shape with zero rise and fall times, the maximum peak power of this pulse would be 78.4 W. For a square pulse with a 50-nsec duration transmitted every 5 μsec, the maximum peak power would be ten times less, or 7.84 W.

The exposure energy is the energy calculated to pass through a fully open pupil of the eye. The International Electrotechnical Commission (IEC) standard includes instructions on how this should be measured, and for a system with wavelength of 400 nm to 1,400 nm wavelength, there are two conditions that apply. Condition 1 applies to a beam collimated by a telescope or binoculars so that the hazard is increased where the aperture stop equals 50 mm at 2,000 mm. Condition 3 applies to determining irradiation relevant for the unaided eye, for scanning beams that define an aperture stop/limiting aperture of 7 mm at 100 mm. The reference point for scanned emission is the scanning vertex (pivot point of the scanning beam). A LIDAR system according to the present teaching with a 100 meter range would nominally fire pulses every microsecond to maximize the refresh rate. In this example, the optical peak power is constrained so that a pulse every one microsecond would need to be five times less in magnitude then if a pulse was fired every five microseconds.

Figure 2:
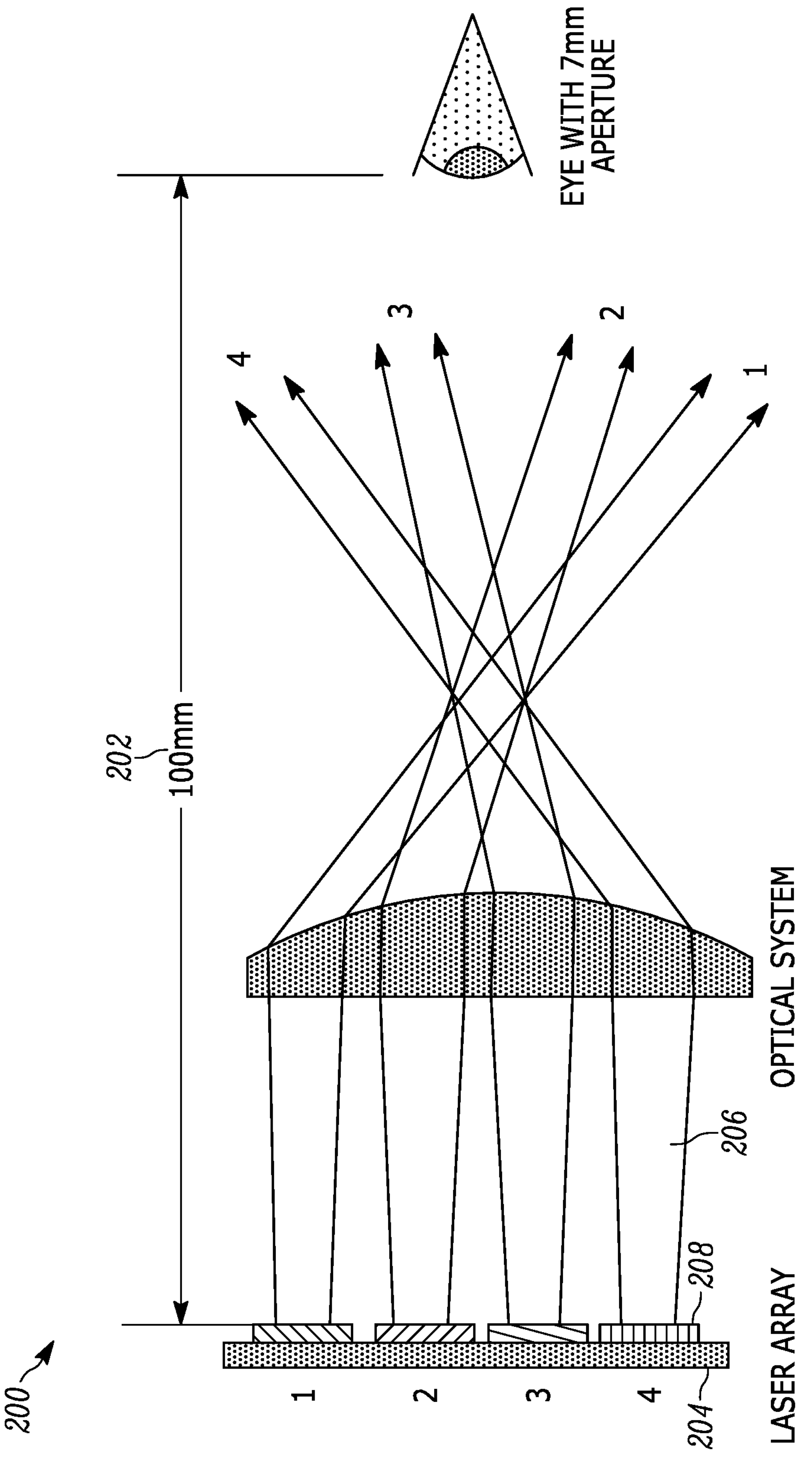
FIG. 2 illustrates a diagram for determining Maximum Permissible Exposure (MPE) limits for a LIDAR system of the present teaching.

One aspect of the present teaching is that LIDAR systems that use a plurality of lasers can be operated such that the lasers are energized in a way that reduces, or substantially eliminates, the overlap in optical power of the plurality of optical beams so as to create an eye safe system. As described herein, MPE provides a maximum energy measured at any fixed 7-mm aperture at a distance of 100 mm from the laser array, as well as at 50 mm at a distance of 2,000 mm. The added power at particular measurement points from the overlap of the plurality of optical beams will affect the maximum powers allowed for each optical beam. However, the performance, e.g. signal-to-noise, for each measurement point will be limited by this maximum power. FIG. 2 illustrates this concept.

FIG. 2 illustrates a diagram for determining MPE limits for a LIDAR system illuminator 200 of the present teaching. It is desirable for some applications to operate with each beam generated by a particular laser at the MPE limit for a Class 1 standard. In these embodiments, if two beams are operating simultaneously and overlap, the energy will exceed the MPE limit in the region of optical beam overlap. In these embodiments, one solution according to the present teaching to the problem of overlapping optical beams is to energize, or fire, the lasers that generate the overlapping optical beams at separate times. In this way, the energy of both beams is not simultaneously provided in an overlapping section of the two optical beams. This allows both beams to operate at the full energy level allowed by the MPE, without the chance that the system would exceed the eye-safe limit in the overlapping beam region.

The LIDAR system illuminator 200 is designed such that at a distance of 100 mm 202 from the laser array 204, the four beams 206 corresponding to discrete lasers 208, are spaced further apart then 7 mm. Said another way, none of the optical beams 206 are closer than 7 mm at the 100 mm distance so they do not overlap at 100 mm. In this optical configuration, all four lasers 206 could be fired simultaneously without any two of the optical beams combining to form a combined beam that has more optical power than any of the individual optical beams in a manner that impacts eye safety. This is true regardless of whether each laser emits an optical beam with a unique wavelength or whether at least two of the optical beams emit optical beams with the same wavelength. Various embodiments of the scanning LIDAR system of the present teaching utilize illuminators comprising lasers or laser arrays operating at a single wavelength and illuminators comprising lasers or laser arrays operating at multiple wavelengths.

In some embodiments of the LIDAR system illuminators of the present teaching that utilize numerous lasers, such as hundreds of lasers, it is likely that the optical beams from some lasers would overlap at the eye safety measurement aperture, and some would not. In such systems, the sequence of firing of the lasers cannot be totally random in order to prevent overlapping beams that could present an eye safety danger. Thus, one aspect of the present teaching uses a pseudorandom sequence of firing of the lasers. The pattern of firing satisfies a set of mathematical rules which results in an allowed sequence of firing that meets the eye safety limit.

Another aspect of the present teaching is to select preferred firing sequences that would maximize the refresh rate of the system while maintaining an eye safe environment. For example, a non-random firing pattern can be determined which would maximize the overall pulse rate, while maintaining an eye-safe environment. Such a firing pattern could be implemented through a set of rules established in, for example, the firmware of the controller that fires the lasers.

In different embodiments of the LIDAR illuminators of the present teaching, each laser source generates an optical beam with a particular energy based on the pulse width, repetition rate, and peak power of the optical pulses. It is understood by those skilled in the art that the optical beam generated by each laser source has a particular energy density as a function of position in a plane located at the measurement distance. The energy density of the light produced from multiple laser sources in the plane located at the measurement distance is the sum of the individual energy densities as a function of position in the plane resulting from the combination of optical beams. An eye-safe classification is met, for example, if the combined energy density of the combined optical beam as a function of position results in a peak energy, sampled in a 7-mm aperture diameter across the plane at a 100-mm measurement distance, which does not exceed the MPE.

By controlling the pattern of electrical signals that fire the plurality of laser sources, it is possible to control the energy density produced in a plane by the combined optical beams of those plurality of lasers. In particular, it is possible to produce a combined optical beam from the plurality of laser sources wherein a peak optical energy of the combined optical beam in a measurement aperture at a particular measurement distance is less than a desired value. In some embodiments, the measurement aperture is the 7-mm aperture defined by the International Electrotechnical Commission, the measurement distance is 100 mm, and the peak optical energy is the MPE as defined by the International Electrotechnical Commission and based on the particular laser wavelength.

Figure 3:
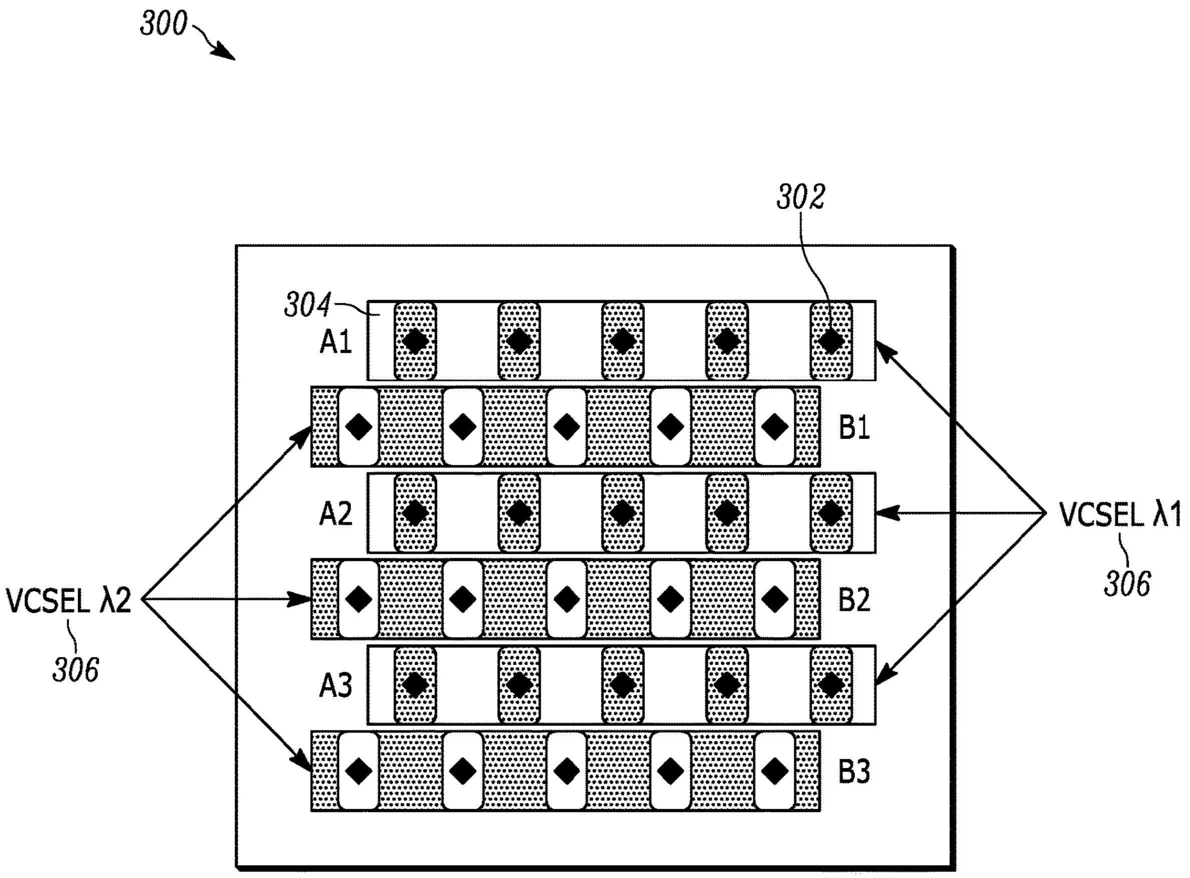
FIG. 3 illustrates an embodiment of a laser array for a LIDAR system illuminator of the present teaching.

FIG. 3 illustrates an embodiment of a laser array 300 for a LIDAR system illuminator of the present teaching. The laser array 300 consists of thirty individual laser emitters 302 in a configuration of three bars 304 each with two different wavelengths 306. In this configuration, the laser emitters 302 that are immediately adjacent to each other would generate optical beams that overlap in a particular eye-safety measurement aperture. Optical beams generated by laser emitters 302 that are not immediately adjacent would not overlap. The refresh rate can be maximized without impacting eye safety by using a rule that adjacent lasers cannot be fired simultaneously, but non-adjacent lasers of different wavelength can be fired simultaneously.

In this firing rule, lasers 302 on bars 304 labeled B1 in FIG. 3 could not be operated when lasers 302 on bars 304 labeled A1 and A2 in FIG. 3 are operated. In addition, lasers 302 on bars 304 labeled A2 could not be operated when lasers 302 on bars 304 labeled B1 and B2 are operated. Also, lasers 302 on bars 304 labeled A1 may be operated simultaneously lasers 302 on bars 304 labeled B2. In this way, a system of firing rules that allows simultaneous operation of non-adjacent bars at the maximum pulse rate of the system, but ensure that the resulting energy in the optical beams in the eye safety measurement aperture is below the Maximum Permissible Exposure (MPE) limit. This ensures Class 1 eye safety of the overall LIDAR system.

In some embodiments of the scanning LIDAR system of the present teaching, the rules for firing patterns for lasers are generated based on monitoring the illumination pattern that is emitted from the illuminator. That is, a monitor would determine the peak energy in a particular aperture at a particular distance, and a firing pattern would be determined that ensured the peak energy in a particular aperture at a particular distance was less than a particular value. In some embodiments, a rule for the firing pattern of the lasers would be no lasers that produce two or more optical beams that overlap in any eye-safety measurement aperture associate with the illuminator are operated simultaneously. This rule would apply to a system in which each laser generated an optical beam that produced the maximum energy allowed within the eye-safety measurement aperture.

Another aspect of the present teaching is that various operating specifications, such as laser power operating variations and the mechanical tolerances for positioning the optical beams in the illuminator can be achieved by appropriate choice of the rules for firing (energizing or activating) patterns for the lasers.

Figure 4A:
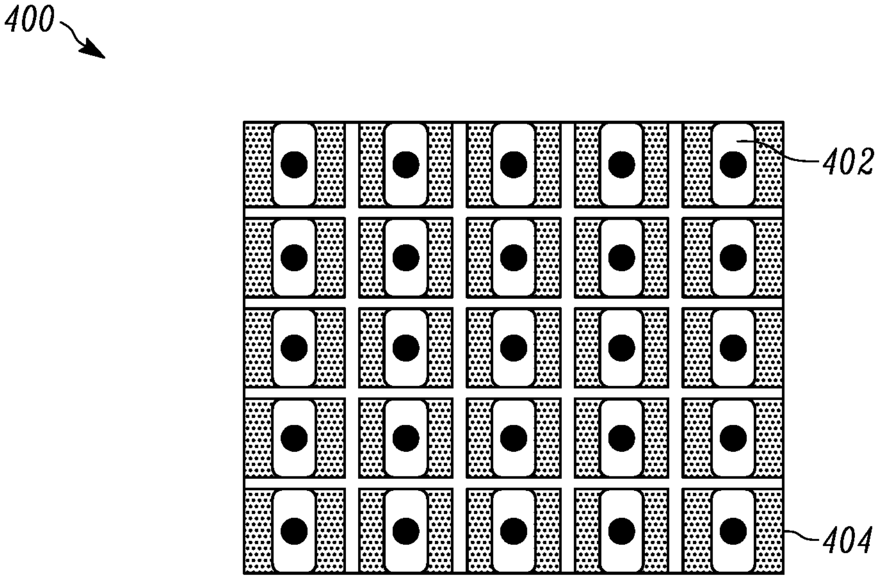
FIG. 4A illustrates a chip comprising multiple cluster VCSEL devices arranged individually.

Various embodiments of the LIDAR systems of the present teaching utilize multiple cluster VCSEL devices on a single chip. FIG. 4A illustrates an array 400 comprising multiple cluster VCSEL devices 402. In particular, FIG. 4A illustrates a twenty-five cluster VCSEL devices 402 in a two-dimensional array. The array is formed with contacts 404 for twenty-five individual cluster VCSEL devices 402 that can be individually biased.

Figure 4B:
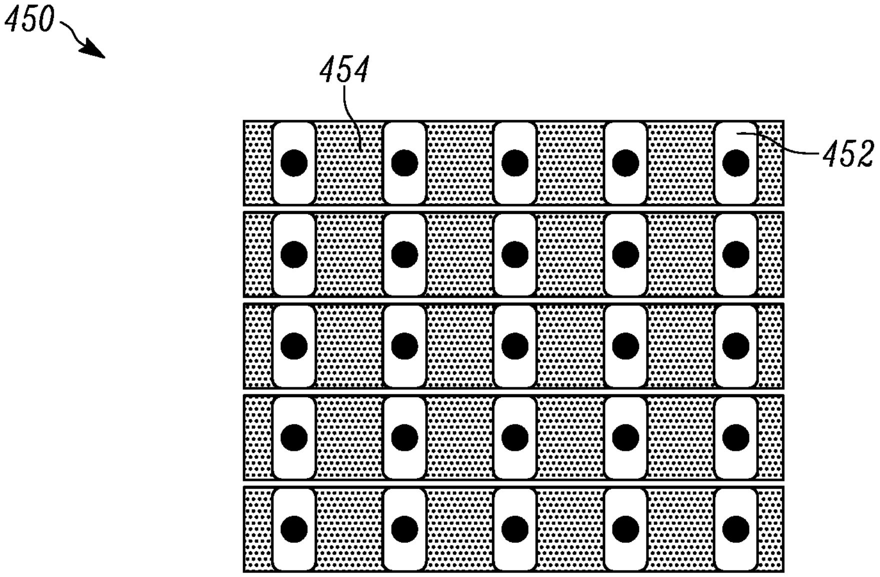
FIG. 4B illustrates a chip comprising multiple cluster VCSEL devices arranged in bars.

FIG. 4B illustrates an array 450 comprising multiple cluster VCSEL devices 452. FIG. 4B illustrates that the array is arrange to include five cluster VCSEL devices 452 connected with contacts 454 that form five bars with each bar including five cluster VCSEL devices 452. It will be evident to those familiar with the art that a single monolithic 2D VCSEL array can be produced as well.

Figure 4C:
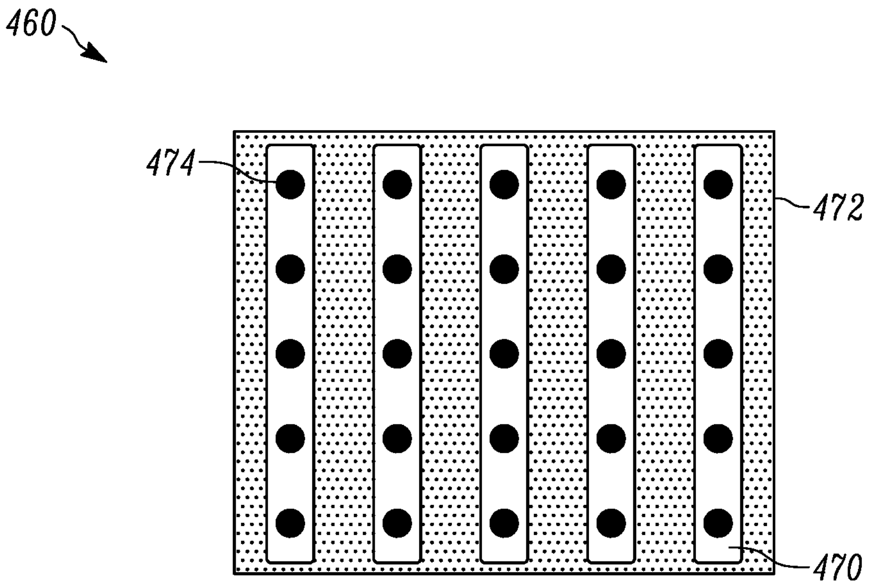
FIG. 4C illustrates a top-view of an anode metal contact pad of a chip comprising multiple cluster VCSEL devices of the present teaching.

FIG. 4C illustrates a top-view of an anode metal contact pad 470 of a chip 472 comprising multiple cluster VCSEL devices 474 in a 2D monolithic VCSEL array. The chip illustrated in FIG. 4C is a top-side illuminating VCSEL array. All the anodes of all VCSEL in a single column are connected together with a single metal contact.

Figure 4D:
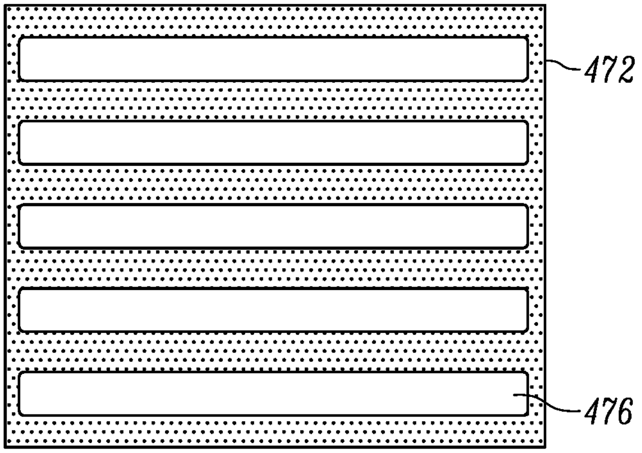
FIG. 4D illustrates a bottom-view of a cathode metal contact pad of the chip comprising the multiple cluster VCSEL devices illustrated in FIG. 4C.

FIG. 4D illustrates a bottom-view of a cathode metal contact pad 476 of the chip 472 comprising the multiple cluster VCSEL devices illustrated in FIG. 4C. All the cathodes in a single row are connected together with a single metal contact in a manner that reduces the number of electrical connections. With this pattern of metallization, individual VCSEL devices 474 (FIG. 4C) can be operated by biasing each row and column contact at the desired bias level. In general, when the anodes of one group of laser emitters are connected to one contact, and the cathodes of a second group of laser emitters are connected to a second contact, only those individual lasers belonging to both the first and second group of laser emitters, i.e. those that have an anode and a cathode connected, will be energized when the first and second contacts are appropriately biased.

For the particular confirmation shown in FIG. 4D with 5 rows and 5 columns, only 10 electrical connections are required versus 25 electrical connections if the VCSEL devices 474 were individually connected. One skilled in the art will appreciate that the configuration shown in FIG. 12D, is one of numerous possible electrical addressing configurations and that the present teaching is not limited to any particular row and column configuration or geometries for the emitters. It's important to note that this advantage in reducing the number of electrical connections is greater as the size of the 2D VCSEL array increases.

The use of one contact connected to anodes of one group of laser emitters and a second contact connected to cathodes of a second group of laser emitters can be used to energize one laser emitter, or groups of laser emitters, for a particular bias condition, depending on the configuration of the connections. The anodes connections of various lasers to various contacts and the cathodes connections of various lasers connected to various contacts determine the rules for firing patterns. For example, the known pattern of individual laser emitters, or groups of laser emitters, that are energized together, and the energy the optical beams these lasers generate at a particular eye-safety measurement aperture, are all accounted in a fire control scheme when determining which individual lasers or groups are allowed to fire simultaneously.

Figure 5:
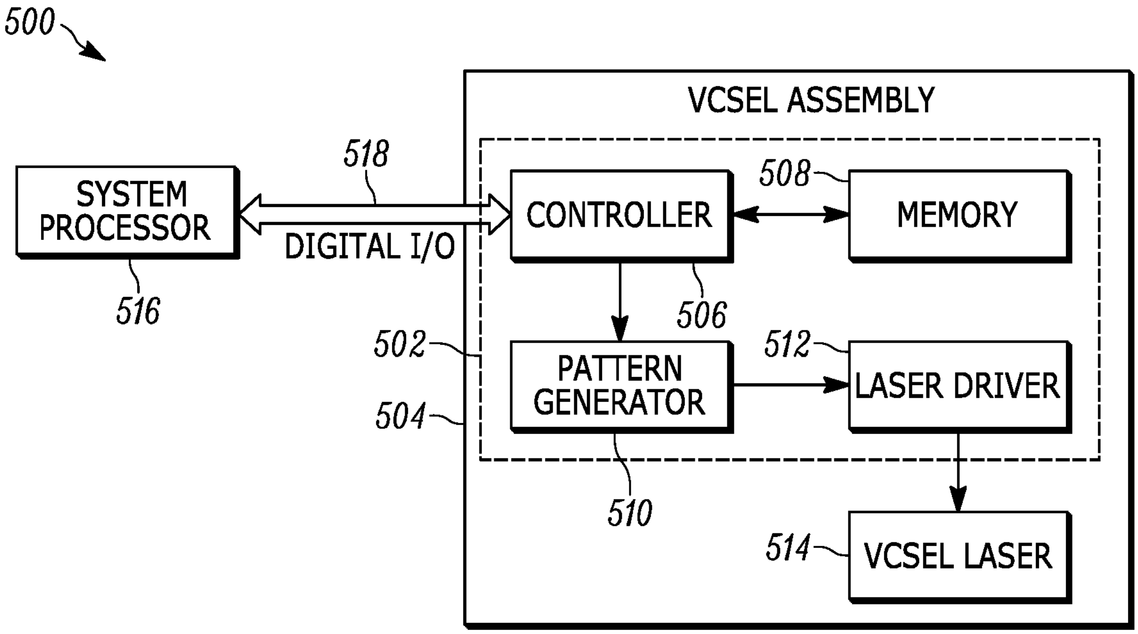
FIG. 5 illustrates a system block diagram of an embodiment of a compact VCSEL laser driver assembly for an eye-safe LIDAR system according to the present teaching.

FIG. 5 illustrates a system block diagram of an embodiment of a compact VCSEL laser driver assembly 500 for a multi-wavelength LIDAR of the present teaching. In this embodiment, the pulse generation chain 502 is generated locally on the same carrier of the VCSEL assembly 504. The pulse generation chain 502 comprises a pulse controller 506, memory 508, pulse pattern generator 510, and a laser driver 512. The laser driver 512 is connected to a VCSEL laser 514, as shown. In some embodiments, the laser driver is connected to a common contact used to drive multiple VCSEL lasers. In some embodiments, pulse shapes might be stored in a local memory or generated by a combination of the controller and pattern generator.

The system processor 516 is connected via a digital input/output connection 518. The system processor 516 generates a set of instructions that instructs the laser to fire and for how long. These instructions will determine the firing pattern type. But, the firing pattern generation and biasing of the lasers is done locally on the VCSEL assembly. Generating the laser driver pulse patterns locally on the VCSEL assembly greatly simplifies the required interface to the overall LIDAR system. In some embodiments, the pulse controller 506, memory 508, pulse pattern generator 510 and laser driver 512 functions are all contained within a single IC package. In various embodiments, the VCSEL devices can be hermetically packaged or non-hermetically packaged.

The rules for firing the lasers can be stored in various places in the scanning LIDAR system. In some embodiments, the rules for firing the lasers are stored in memory 508. In some embodiments, the rules for firing the lasers are input via the digital I/O 518. In yet other embodiments, the rules for firing the lasers are generated in the system processor based on operating parameters of the LIDAR system. In yet other embodiments, the rules for firing the lasers are generated in the controller based on operating parameters of the LIDAR system. In yet other embodiments, the rules for firing the lasers change over time based on changes in output power, pulse widths, and repetition rates provided by the laser driver assembly 500.

Figure 6A:
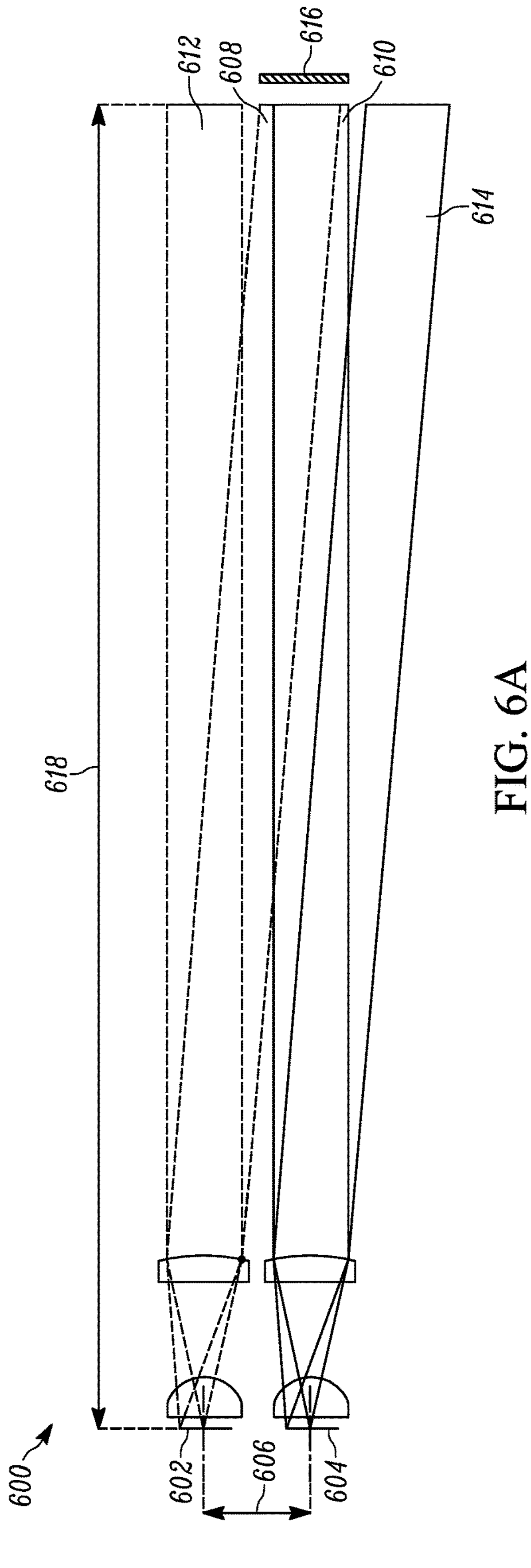
FIG. 6A illustrates a schematic diagram of an embodiment of LIDAR illuminator of the present teaching using two arrays of VCSEL of different wavelengths with a first lens system.

One feature of the present teaching is that a combination of the spacing of the transmitter elements and/or the transmitter arrays, the firing pattern of the transmitter elements, and the optics used for projection and/or collimation determine if and where in space laser beams will overlap. In addition, separate arrays with separate wavelengths may be used. FIG. 6A illustrates a schematic diagram of an embodiment of LIDAR illuminator 600 of the present teaching using two arrays of VCSEL of different wavelengths with a first lens system. The two VCSEL arrays 602, 604 are offset by a distance 606 of ~8 mm. It can be seen that in some cases, the individual laser beams 608, 610 from each array of VCSEL will combine in space, while in other cases the lasers beams 612, 614 will not combine. A geometrical relationship exists that determines the criterion under which the beams 608, 610, 612, 614 will combine or not. For example, with an 8 mm offset distance 606 between arrays 602, 604, beams that are projected at the same nominal angle (i.e. beams 608, 614 and beams 612, 610 from the two separate arrays) will not combine spatially to exceed the eye safety limit at a 7 mm aperture 616 that is positioned at a distance 618 of 100 mm. If we were to take only the 7 mm aperture 616 into account, a simple rule that would allow simultaneous firing of VCSEL from both arrays 602, 604 would be to choose the same position within each array under the assumption that the lens systems for each array are nominally identical.

Figure 6B:
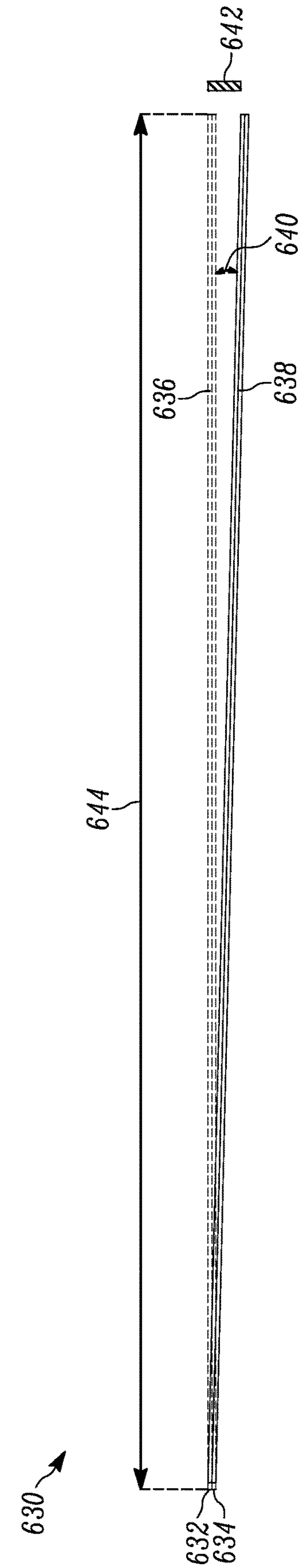
FIG. 6B illustrates a schematic diagram of an embodiment of LIDAR illuminator of the present teaching using two arrays of VCSEL of different wavelengths with a second lens system.

However, if the beams are highly collimated, then we need to consider the other eye safety criteria corresponding to use of binoculars. FIG. 6B illustrates a schematic diagram of an embodiment of LIDAR illuminator 630 of the present teaching using two arrays 632, 634 of VCSEL of different wavelengths with a second lens system that produces highly collimated beams. Two beams with the same projection angle when highly collimated will combine in a 50 mm aperture at 2,000 mm. In order for the beams to not combine in a 50 mm aperture at 2,000 mm, the beams must differ by ~1.4° relative to each other. Thus, in the embodiment shown in FIG. 6B, the laser beams 636, 638 from the two arrays 632, 634 are projecting at an angle 640 of 1.4° relative to each other so that the laser eye safety rule will be met for the condition of use of binoculars. The laser beams 636, 638 do not overlap in a 50 mm aperture 642 at a distance 644 of 2000 mm. In some embodiments, the lens system of FIG. 6B is the same as the lens system in the embodiment described in connection with FIG. 6A, and the projection angles that determine whether or not the beams combine is based on the firing pattern of the laser elements in the VCSEL arrays. In some embodiments, the projection angles are also affected by the configuration of the lens system. Regardless of the mechanism by which the projection angles are determined, the condition for non-overlapping beams that meet a laser eye safety rule is a projection at an angle 640 of 1.4° relative to each other.

Figure 6C:
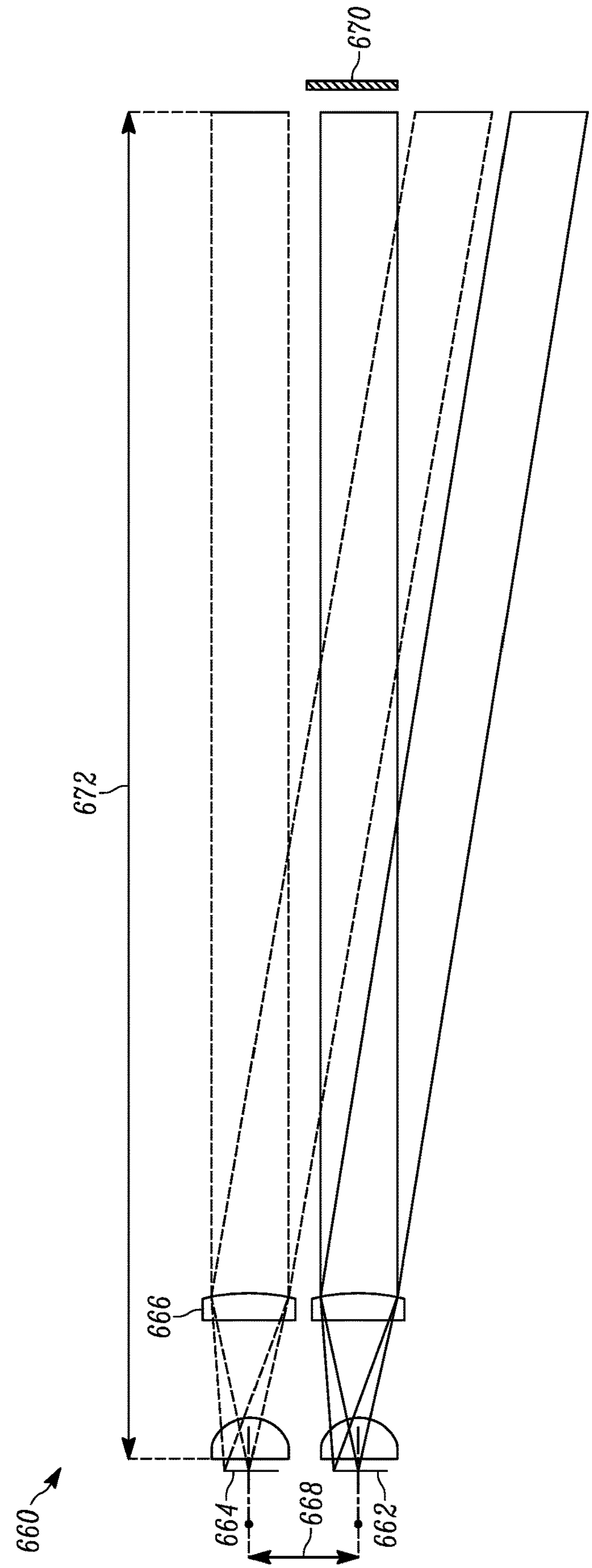
FIG. 6C illustrates a schematic diagram of an embodiment of LIDAR illuminator of the present teaching using two arrays of VCSEL of different wavelengths with a third lens system.

FIG. 6C illustrates a schematic diagram of an embodiment of LIDAR illuminator 660 of the present teaching using two arrays 662, 664 of VCSEL of different wavelengths with a third lens system 666. The two arrays 662, 664 are separated by a distance 668 of ~8 mm. The range of angles excluded from the 7 mm aperture 670 at 100 mm distance 672 is shown in FIG. 6C. Here we can see that a range from 0° to −9.5° needs to be avoided for the upper array laser beam relative to the lower array laser beam. Thus, when combining the two safety conditions in some embodiments, the system utilizes a relative projection angle between an upper beam and a lower beam that is outside the range from 1.4° to −9.5° in order to perform simultaneous firing of the lasers.

EQUIVALENTS

While the Applicant's teaching are described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A LIDAR illuminator comprising:

a) a plurality of laser sources arranged such that optical beams generated by at least two of the plurality of laser sources overlap spatially at a target and at least two optical beams generated by at least two other laser sources of the plurality of laser source do not overlap spatially at the target, each of the plurality of laser sources comprising an electrical input that receives a modulation drive signal that causes each of the plurality of laser sources to generate an optical beam; and b) a controller having a plurality of electrical outputs, a respective one of the plurality of electrical outputs being connected to an electrical input of a respective one of the plurality of laser sources, the controller generating a plurality of modulation drive signals such that the at least two of the plurality of laser sources arranged such that they generate optical beams that overlap spatially at the target are not energized simultaneously and the at least two other laser sources of the plurality of laser source that generate optical beams that do not overlap spatially at the target are energized simultaneously so that a peak optical energy of an optical beam in a measurement aperture at the target is less than a desired value.

2. The LIDAR illuminator of claim 1 wherein the plurality of laser sources comprises a plurality of vertical cavity surface emitting lasers.

3. The LIDAR illuminator of claim 1 wherein the controller is configured to generate the plurality of modulation drive signals so as to energize the plurality of laser sources at pseudo-random times.

4. The LIDAR illuminator of claim 1 wherein the measurement aperture is about 7 mm at the target.

5. The LIDAR illuminator of claim 1 wherein the controller is configured to generate a plurality of modulation drive signals so that the plurality of laser sources generates pulsed optical beams with a desired pulse width, peak power, and repetition rate so that each beam does not exceed a Maximum Permissible Exposure (MPE) limit in the measurement aperture at the target.

6. The LIDAR illuminator of claim 1 wherein desired value is a Class 1 eye-safe value.

7. The LIDAR illuminator of claim 1 wherein the controller is configured to generate a plurality of modulation drive signals so as maximize a refresh rate of the LIDAR illuminator.

8. The LIDAR illuminator of claim 1 wherein the controller further comprises a memory electrically connected to the controller, the memory storing data representing the plurality of modulation drive signals.

9. The LIDAR illuminator of claim 1 further comprising an optical sensor that measures energy density, the optical sensor having an output that is electrically connected to the controller.

10. The LIDAR illuminator of claim 1 wherein the controller is configured to generate a plurality of modulation drive signals so that they generate a plurality of optical beams that form a combined optical beam that changes as a function of time.

11. A method of LIDAR illumination comprising:

a) providing a plurality of laser sources arranged such that optical beams generated by at least two of the plurality of laser sources overlap spatially at a target and at least two optical beams generated by at least two other laser sources of the plurality of laser source do not overlap spatially at the target; and b) generating a modulation drive signal for each of the plurality of laser sources that causes each of the plurality of laser sources to generate an optical beam such that at least two of the plurality of laser sources arranged such that they generate optical beams that overlap spatially at a target are not energized simultaneously and at least two other of the plurality of laser source generate optical beams that do not overlap spatially at the target are energized simultaneously so that a peak optical energy of the combined optical beam in a measurement aperture at the target is less than a desired value.

12. The method of claim 11 wherein the providing the plurality of laser sources comprises providing a plurality of vertical cavity surface emitting lasers.

13. The method of claim 11 wherein the generating the plurality of modulation drive signals comprises generating the plurality of modulation drive signals so as to energize the plurality of laser sources at pseudo-random times.

14. The method of claim 11 wherein the measurement aperture is about 7 mm at the target.

15. The method of claim 11 wherein the generating the modulation drive signals for each of the plurality of laser sources comprises generating the drive signals so that the plurality of laser sources generate pulsed optical beams with a desired pulse width, peak power, and repetition rate so that each beam does not exceed a Maximum Permissible Exposure (MPE) limit in the measurement aperture at the measurement distance.

16. The method of claim 11 wherein the generating the modulation drive signals for each of the plurality of laser sources comprises generating the modulation drive signals so as to generate a combined optical beam with a peak optical energy in the measurement aperture at the measurement distance that is Class 1 eye-safe.

17. The method of claim 11 wherein the generating the modulation drive signals for each of the plurality of laser sources comprises generating the modulation drive signals so as to generate a plurality of modulation drive signals that maximizes a refresh rate of the LIDAR illuminator.

18. The method of claim 11 further comprising accessing memory to obtain the modulation drive signals.

19. The method of claim 11 further comprising measuring energy density in the measurement aperture at the measurement distance.

20. The method of claim 11 wherein the generating the modulation drive signals for each of the plurality of laser sources comprises generating modulation drive signals so that they generate a plurality of optical beams that form a combined optical beam that changes as a function of time.

* * * * *